United States Patent [19]
Ikonen et al.

[11] Patent Number: 5,924,446
[45] Date of Patent: Jul. 20, 1999

[54] CONTROL APPARATUS FOR LIQUID MEDIUM

[75] Inventors: Alpo Ikonen, Muurame; Hannu Trygg; Esa Salovaara, both of Jyväskylä, all of Finland

[73] Assignee: Safematic Oy, Muurame, Finland

[21] Appl. No.: 08/555,287

[22] Filed: Nov. 8, 1995

[30] Foreign Application Priority Data

Nov. 8, 1994 [FI] Finland ................................ 945253

[51] Int. Cl.$^6$ ................................................ F16K 37/00
[52] U.S. Cl. ...................... 137/552; 73/861.58; 116/273; 137/557
[58] Field of Search ............................ 73/861.52, 861.53, 73/861.55, 861.58; 116/264, 273; 137/552, 557

[56] References Cited

U.S. PATENT DOCUMENTS

| | | | |
|---|---|---|---|
| 4,131,128 | 12/1978 | Gotzenberger | 251/209 X |
| 4,819,577 | 4/1989 | Campau | 116/273 X |
| 5,086,654 | 2/1992 | Malminen | 73/861.58 |
| 5,462,087 | 10/1995 | Fukano et al. | 137/884 |

FOREIGN PATENT DOCUMENTS

| | | |
|---|---|---|
| 61759 | 5/1982 | Finland . |
| 61760 | 5/1982 | Finland . |
| 89747 | 7/1993 | Finland . |
| 2 163 557 | 2/1986 | United Kingdom . |

*Primary Examiner*—Gerald A. Michalsky
*Attorney, Agent, or Firm*—Cushman Darby & Cushman IP Group of Pillsbury; Madison & Sutro LLP

[57] ABSTRACT

A control apparatus for a liquid medium including a body portion provided with flow channels. The body portion includes an inlet for the medium, an outlet for the medium to an apparatus that the medium is conducted to, a return point for the medium returning from the apparatus, and a discharge point through which the medium is discharged from the control apparatus. A flow control valve and flow and pressure measuring devices are arranged after the medium inlet in the flow channels of the body portion. A pressure control valve for controlling the pressure in the flow channels between the flow control valve and the pressure control valve is arranged after the return point. For safety reasons, a pressure relief valve is arranged in the channel system of the body portion provided by the flow channels between the flow control valve and the pressure control valve, the relief valve being arranged to open as the pressure exceeds a certain allowed value.

6 Claims, 3 Drawing Sheets

CONTROL APPARATUS FOR LIQUID MEDIUM

BACKGROUND OF THE INVENTION

The invention relates to a control apparatus for a liquid medium, the apparatus comprising a body portion provided with flow channels, and the body portion comprising an inlet for the medium, an outlet for the medium to an apparatus that the medium is conducted to, a return point for the medium returning from the apparatus, and a discharge point through which the medium is discharged from the control apparatus; a flow control valve and means for measuring the flow and pressure being arranged after the medium inlet in essentially the flow direction of the medium in the flow channels of the body portion, and a pressure control valve for controlling the pressure in the flow channels between the flow control valve and the pressure control valve being arranged after the return point.

The above apparatuses are well known from different fields of technology. Examples for known solutions include the apparatuses of Finnish Patents 61,759, 61,760 and 89,747. These known apparatuses function flawlessly in most situations. In practice, however, it has become apparent that in certain cases of damage, they leave something to be desired. An example for such an instance is that the apparatus in which a liquid medium is used, e.g. a seal of the apparatus, is damaged so that pressurized medium flows into the control apparatus. The pressure will thereby rise excessively in the control apparatus, and the control apparatus may be damaged. At worst, damage in the control apparatus may even cause injury. Another drawback of known apparatuses is that in practice it is not always possible to see it clearly from the flow measuring means whether the medium is flowing or not, or whether e.g. a malfunction has occurred. Yet another problem is how to provide quick and practical flow connections for the medium.

SUMMARY OF THE INVENTION

The object of the invention is to provide a control apparatus by which the drawbacks of the prior art can be eliminated. This is achieved with a control apparatus of the present invention, which is characterized in that a pressure relief valve is arranged in the channel system of the body portion provided by flow channels between the flow control valve and the pressure control valve, the relief valve being arranged to open as the pressure exceeds a certain allowed value.

The primary advantage of the invention is that the drawbacks of the prior art apparatuses that have resulted from an excessive increase in the pressure have here been eliminated. In the present apparatus, a flow is very easy to detect. A flow can even be detected from a relatively long distance due to a ball or the like rotating with the flow. For example, an on/off-type alarm can be arranged in the control room, if necessary, whereby continuous monitoring becomes unnecessary. Another advantage of the invention is that its flow connections are useful and reliable. Yet another advantage is that the invention is very simple, whereby the costs for the production and operation and for putting the invention to use are low.

BRIEF DESCRIPTION OF THE DRAWINGS

In the following, the invention will be described in greater detail with reference to one advantageous embodiment described in the attached drawing, wherein.

DETAILED DESCRIPTION

Figure 1:
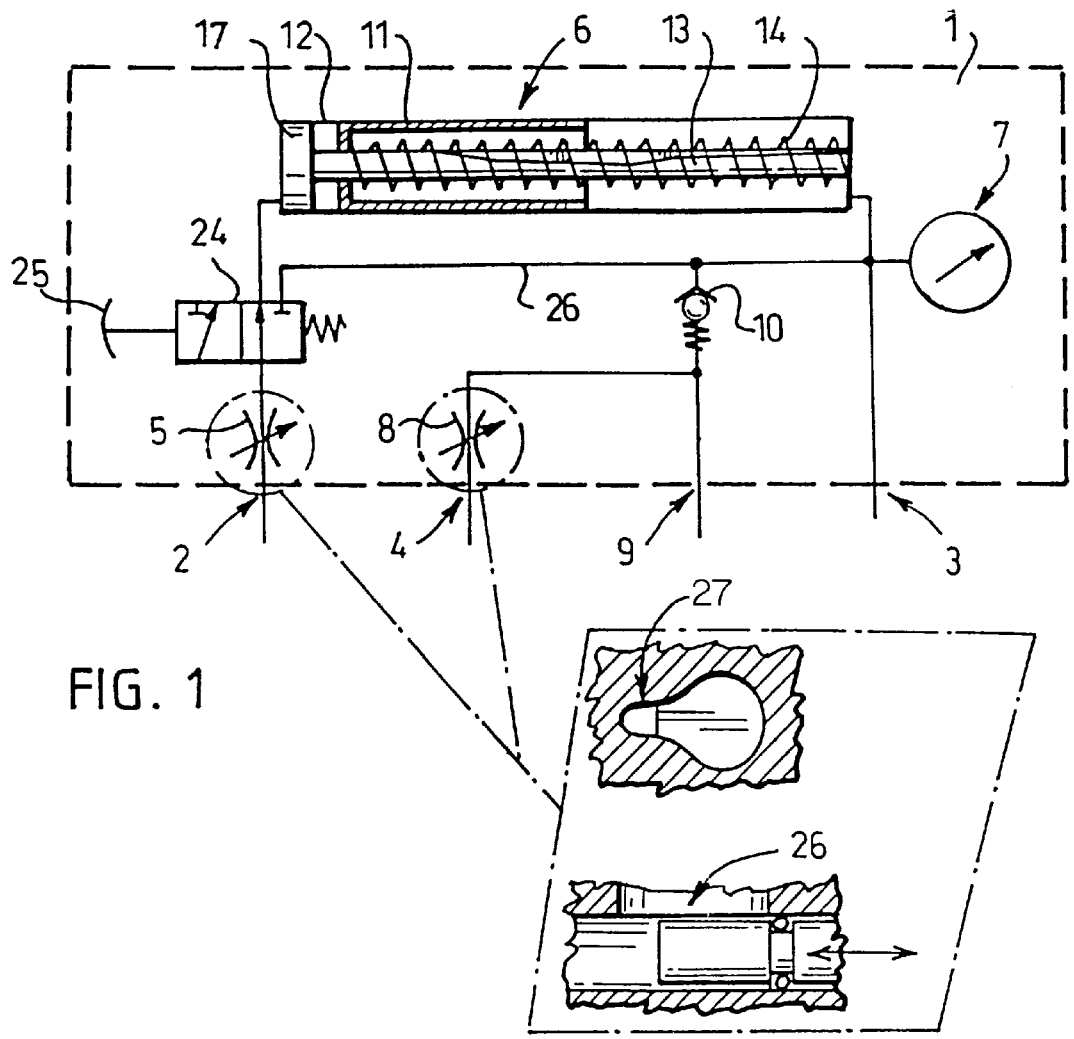
FIG. 1 shows a general view of a control apparatus according to the invention.

The figures illustrate one advantageous embodiment of a control apparatus according to the invention. A body portion provided with flow channels is indicated generally by reference number 1. The body portion comprises an inlet 2 for the medium, an outlet 3 for the medium to an apparatus that the medium is conducted to, and a return point 4 for the medium returning from the apparatus. The apparatus that the medium is conducted to is not shown in the figure. The apparatus may be, e.g., a pump comprising a shaft and a seal therein, sealing water being conducted to the seal. A flow control valve 5 and means 6, 7 for measuring the flow and pressure are arranged after the medium inlet 2 in essentially the flow direction of the medium in the flow channels of the body portion 1. After the return point 4, there is also a pressure control valve 8 for controlling the pressure in the flow channels between the flow control valve 5 and the pressure control valve 8. Reference number 9 indicates the point where the medium is outlet for recirculation or to a sewer.

According to the essential idea of the invention, a pressure relief valve 10 is arranged in the channel system of the body portion 1 provided by flow channels between the flow control valve 5 and the pressure control valve 8, the relief valve being arranged to open as the pressure exceeds the allowed value. The allowed value can naturally be defined separately in each case, in accordance with the requirements set by the equipment.

Because of the above arrangement, the pressure in the control apparatus cannot rise dangerously high.

The operation of the control apparatus according to the invention can be described briefly as follows. A liquid medium flows through an inlet 2 to a body portion 1. The flow is regulated with a valve 5. The regulated flow rate is indicated by a measuring means 6 as the position of a float 11 is compared to a pre-calibrated scale located at a flow pipe 12. The medium flow moves the float 11 loaded by counterforce to a position that corresponds to the flow rate such that the force of the flow and the counterforce are in balance. Counterforce can be generated, e.g., by a spring 14 or by gravity, or in some other way. The passage of the flow, and the movement of the float 11 are shown clearly in FIGS. 1 and 2. The principle passage of the flow is indicated by an arrow in FIG. 2.

When the apparatus is designed, the force by which the flow moves the float 11 at different flow rates can be affected by changing the port between the float 11 and the static parts, such as a flow pipe 12 and a flow spindle 13, both in the radial and in the axial direction.

From the flow measuring means 6, the medium flows through the outlet 3 to the point of use. From the point of use, the medium returns though the return point 4 to the pressure control valve 8. The valve 8 is used for adjusting the pressure prevailing in the flow channels between the flow control valve 5 and the pressure control valve 8. The pressure can be read from the pressure meter 7. When the adjustments are made, valves 5 and 8 must, in practice, be used simultaneously or alternately to obtain the desired values for the flow and pressure.

Finally, the medium flows through a discharge point 9 to a sewer or a refuse bin, or for recirculation. The pressure relief valve 10 opens, letting the excess pressure pass from the control apparatus to the discharge point 9 past the pressure control valve 8, if, e.g., the pressure at the inlet 2 increases or if pressurized liquid flows from the point of use to the control apparatus because of damage in the apparatus, e.g. in a seal thereof. The function of valve 10 is to protect the control apparatus from excess pressure and thereby to eliminate the risk of damage caused by the pressure and to reduce the number of accidents.

Valve 10 is a valve loaded by counterforce. Counterforce can be generated, e.g. by means of a spring. The function of the spring is to release pressure from the control apparatus if the pressure in the channel system defined by the flow control valve 5 and the pressure control valve 8 rises, because of a malfunction, to a value that is higher than the predetermined value. The pressure is released to the discharge point 9 as described above.

The valve 10 is, in practice, of major importance, since it protects the control apparatus from damage and the staff from accidents.

The above flow measuring method is known per se. It is described in the aforesaid Finnish Patents 61,759, 61,760 and 89,747. As regards the shape, the flow spindle 13 is, e.g., a surface with a varying profile, inclined at varying angles, as, e.g., in the solution of Finnish Patent 89,747.

With regard to the function, the key factor is that the surface of the spindle 13 is shaped such that the flow channel formed between the spindle and the float 11 is as wide as possible with each flow rate at every point. The purpose of this is to allow as large particles as possible to pass through the measuring part.

In the example shown in the figures, the spindle 13 is locked at its both ends such that it cannot move from its position in the axial direction. The above structural feature is shown clearly in FIG. 3. It is important that the spindle stay in its position in the axial direction, since it is the position of the spindle that determines the accuracy of the scale. The spindle, however, should be arranged such that it is able to 'float' in the radial direction, whereby it does not tend to center the float and thereby prohibit the movements of the float. With regard to measuring, for example, it is important that the float 11 be very sensitive in its movements, i.e. the friction between the float 11 and the inner surface of the flow pipe be small. The above 'floating' arrangement can be provided, e.g., by connections 15, 16 shown in FIG. 3, which can be implemented, for example, by means of suitably large holes. For the sake of clarity, FIG. 3 shows the float 11 in two different positions: above the axis of symmetry of the flow pipe, the float is shown in a position to which it moves with the flow, and below the axis of symmetry, it is shown in a position that it assumes when the medium is not flowing.

Figure 2:
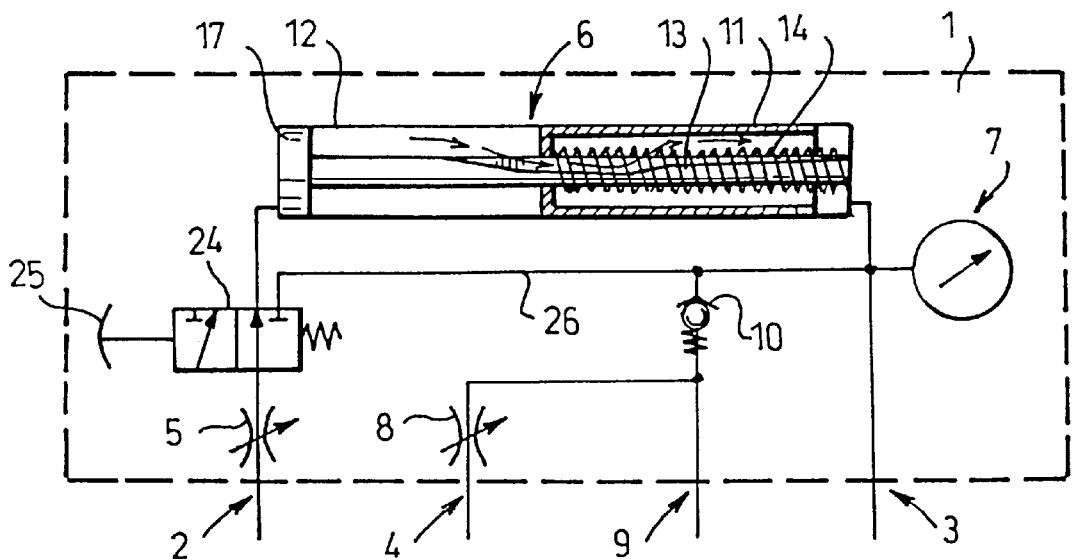
FIG. 2 shows a general view of a control apparatus according to FIG. 1 in a situation where a medium is flowing through the apparatus.
Figure 6:
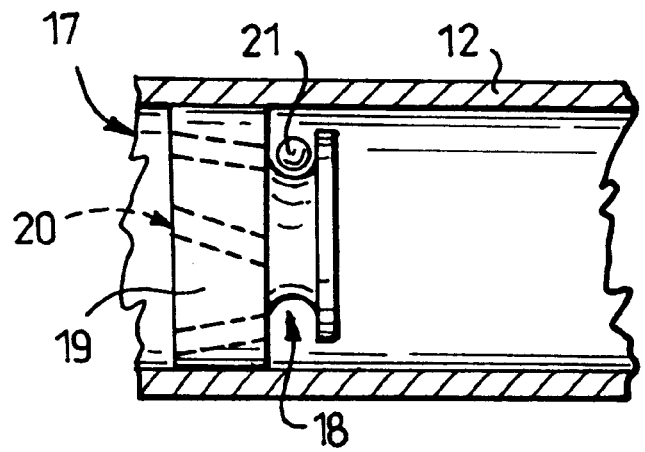
FIG. 6 shows an enlarged view of one detail of an apparatus according to the invention.

At the forward end of the flow measuring part 6A, a flow indicator 17 can be arranged. A flow indicator is needed, since it is not always possible to see it clearly through a glass structure in the flow measuring part whether the liquid is flowing or not, and whether a malfunction has occurred. The position of the flow indicator 17 is shown in FIG. 1. The structure of the indicator is shown in greater detail in FIG. 6. The indicator comprises a part 19 provided with a circumferential groove 18, arranged in the flow pipe 12. Part 19, in turn, comprises slanting channels 20, through which the medium flows. In the circumferential groove, a block 21 is arranged in a movable fashion. As the medium flows through the channels 20; the force of the flow makes the block 21 rotate along the circumferential groove 18. The block 21 can be of a different colour from the groove 18, whereby it differs clearly from the background and shows unambiguously whether or not the medium is flowing through the apparatus. The block 21 may be, e.g., a ball.

Figure 3:
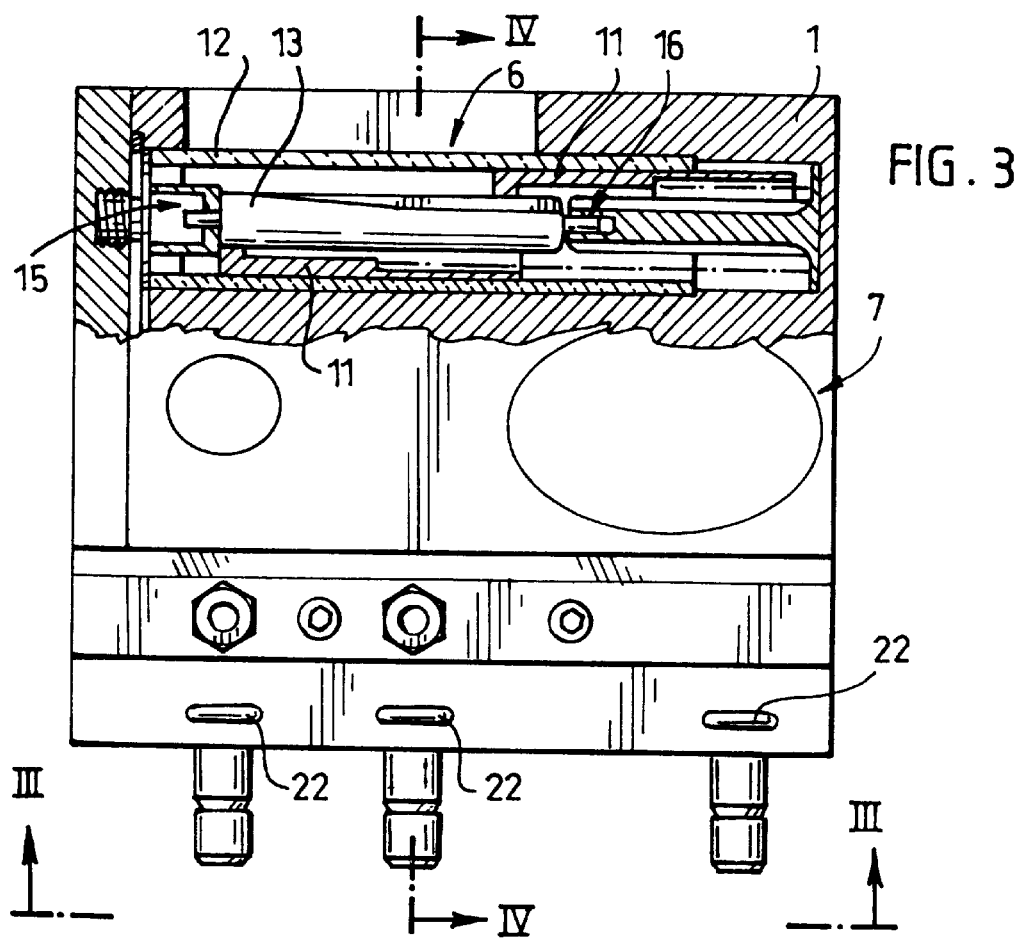
FIG. 3 shows a front view of an apparatus according to the invention.
Figure 4:
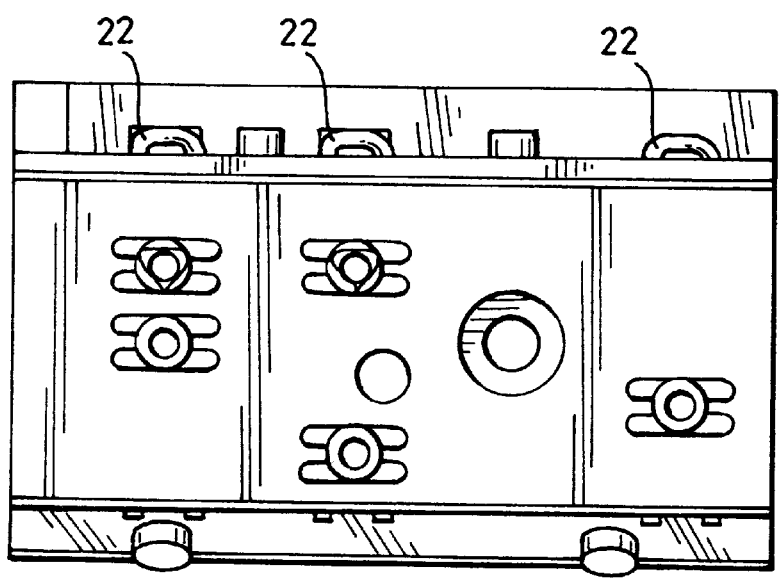
FIG. 4 shows a view of an apparatus according to FIG. 3 taken along line III—III.
Figure 5:
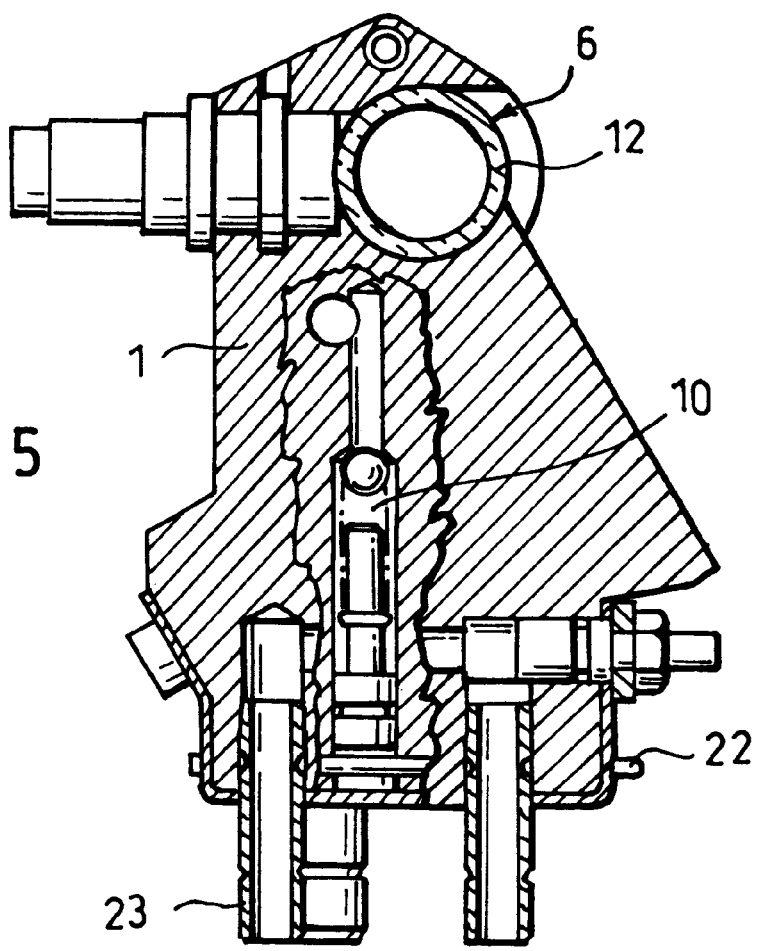
FIG. 5 shows a cross-sectional view of an apparatus according to FIG. 3 taken along line IV—IV.

The connections at different points of the apparatus, e.g. at the inlet 2, preferably comprise a cotter joint, which is shown clearly in FIGS. 3 to 5. A closure pin 22 is a U-shaped part. The closure pin is shaped such that it locks in the groove. At hose spindles or connectors 23, the cotter 22 leans against the body portion 1. One or more connectors can be fastened with the cotter.

The control apparatus of the invention can also be provided with a suitable cleaning system. In the example of the figures, a control valve 24, which may be, e.g., a valve loaded by counterforce, is arranged in the apparatus. Counterforce can be generated e.g. by means of a spring. The control valve 24 is normally in the position shown in FIG. 1, whereby the medium flows to the forward end of the flow pipe. When a button 25 is pressed such that the spring force of the valve is surpassed, the flow changes its course, passing through channel 26 to outlet 3. Simultaneously, the flow to the forward end of the flow pipe is stopped. The float 11 is thereby no longer loaded by the force caused by the flow, and so the spring force is able to press the float to the end of the flow pipe 12 to a so-called zero position. The purpose of the movement is that a ring on the surface of the float 11 rubs the inner surface of the flow pipe, scraping any impurities that have attached thereto and that make the meter more difficult to read. When the button 25 is released, the spring force re-presses the valve 24 to the position shown in FIG. 1, and it is again possible to read the flow from the flow pipe. To obtain a good cleaning result, this measure can be taken several times in succession.

The valves 5, 8 may be any suitable valves. It has been found particularly advantageous, however, to implement a screw and a valve spindle moved by a screw mechanism as an integral structure. A valve control opening 27 can be provided in the body portion of the control apparatus 1. The opening 27 may be essentially drop- or pear-shaped, and vary in its dimensions. The size of the opening 27 may vary in accordance with the size of the meter and the desired control characteristics. The drop- or pear-shaped port 27 makes accurate regulation possible, and simultaneously allows the passage of as large particles as possible. The port 27 is shown, in principle, in FIG. 1.

The means for measuring the flow and pressure can be provided with an adjustable memory. The memory is set at the ideal values. Preferably, the functions of the memory can be implemented as easily detectable pointer-like structures.

It is also possible to provide the control apparatus with a glass structure from which it can be seen if the liquid to be controlled and measured is mixing with a liquid of a clearly different colour. The presence of a liquid of a different colour may indicate, e.g., a damaged seal between the return point and the outlet. The glass structure may comprise a body portion, a glass portion, and connections. It is also possible to arrange a valve in the glass structure to take the impure liquid away from the regular channel for special treatment.

Both the flow and pressure meters of the control apparatus of the invention can also be provided with any kind of suitable alarm, such as an electric light and/or sound alarm.

The embodiment described with reference to the figures is not intended to limit the invention in any way, but the invention can be varied quite freely within the scope of the claims. It is thus obvious that the apparatus of the invention, or its details, need not necessarily be exactly as shown in the figures, but other kinds of solutions are also possible. For example, the invention is not limited to any particular material, but e.g. the body portion can be made from any suitable material. It has proved especially advantageous, however, to use plastic material, whereby the valve 5, 8 control openings can preferably be implemented by an injection moulding method.

We claim:

1. A control apparatus for a liquid medium, comprising:

a body portion;

a first flow channel provided in said body portion; said first flow channel having an inlet for the liquid medium, and an outlet for the liquid medium; said first flow channel being arranged for flowing of the liquid medium in an upstream-to-downstream flow direction from said inlet to said outlet; said outlet being arranged to serve an apparatus to which the liquid medium is to be conducted in use;

a second flow channel provided in said body portion; said second flow channel having a return point for reintroducing the liquid medium into the body portion upon returning of the liquid medium from the apparatus in use; said second flow channel further including a discharge point for discharging the liquid medium from the body portion; said second flow channel being arranged for flowing of the liquid medium in an upstream-to-downstream flow direction from said return point to said discharge point;

a flow control valve, a flow measuring means and a pressure measuring means being interposed in said first flow channel intermediate said inlet and said outlet;

a pressure control valve interposed in said second flow channel downstream of said return point and upstream of said discharge point, and arranged for controlling pressure in said flow channels between said flow control valve and said pressure control valve;

a third flow channel intercommunicating said first flow channel and said second flow channel; and a pressure relief valve interposed in said third flow channel and arranged to open from said first flow channel towards said second flow channel, only when pressure in said first flow channel exceeds a certain allowed value.

2. The control apparatus of claim 1, wherein:

said flow measuring means is elongated along said first flow channel and has a forward end which is located upstream in said first flow channel relative to a remainder of said flow measuring means; and said forward end is provided with a flow indicator which is readable from outside of said body portion.

3. The control apparatus of claim 2, wherein said flow indicator comprises:

a part having a groove;

a mobile block arranged in said groove; and means defining a flow path for the liquid medium past the flow indicator, arranged such that when the liquid medium flows in said flow direction of said first flow channel past said flow indicator, said mobile block moves in said groove.

4. The control channel of claim 1, wherein:

said body portion, at each of said inlet, outlet, return point and discharge point is provided with a respective hose spindle which is externally circumferentially grooved; and a respective U-shaped closure pin associated with each said spindle for holding a respective hose end portion mounted on the respective hose spindle.

5. The control apparatus of claim 1, wherein:

said flow measuring means includes a flow pipe elongated along said first flow channel, a flow spindle extending along said flow pipe within said first flow channel and having an upstream end and a downstream end; said flow spindle being supported at both of said ends so as to be limited to movement in a radial direction relative to said flow pipe; said flow spindle having a peripheral surface;

a float received in said flow pipe around said flow spindle; said float having a peripheral surface facing said peripheral surface of said flow spindle, these peripheral surfaces defining a port therebetween;

said float being arranged to be moved longitudinally of said flow pipe by force of fluid medium flowing in said flow pipe;

said flow spindle varying in transverse cross-sectional area longitudinally thereof, such that said port varies in size as said float moves along said float spindle.

6. The control apparatus of claim 1, wherein:

each of said flow control valve and said pressure control valve including a valve member which is movable for opening and closing a port provided in the respective said flow channel; said port being one of drop-shaped and pear-shaped.

* * * * *